United States Patent [19]
Kang et al.

[11] Patent Number: 6,017,985
[45] Date of Patent: Jan. 25, 2000

[54] HYDROSILATED CRYSTALLINE HIGH TRANS POLYBUTADINE WITH SILICA FILLER, TIRES HAVING A BASE OF SAID COMPOSITION AND METHOD OF PREPARING SAME

[75] Inventors: Jung W. Kang, Honolulu, Hi.; Jason T. Poulton, Newark, Ohio; Takashi Kitamura, Musashimurayama, Japan

[73] Assignee: Bridgestone Corporation, Tokyo, Japan

[21] Appl. No.: 08/845,130

[22] Filed: Apr. 21, 1997

[51] Int. Cl.⁷ .................................................. C08J 5/32
[52] U.S. Cl. ............................................. 524/263; 524/572
[58] Field of Search ...................... 524/572, 263

[56] References Cited

U.S. PATENT DOCUMENTS

| | | | |
|---|---|---|---|
| 3,881,536 | 5/1975 | Doran, Jr. et al. | 152/330 |
| 5,037,912 | 8/1991 | Patterson et al. | 526/174 |
| 5,174,838 | 12/1992 | Sandstrom et al. | 152/209 |
| 5,227,425 | 7/1993 | Rauline | 524/493 |
| 5,753,761 | 5/1998 | Sandstom et al. | 525/236 |
| 5,804,644 | 9/1998 | Nakafutami et al. | 524/572 |

FOREIGN PATENT DOCUMENTS

| | | |
|---|---|---|
| 0 070 994 | 5/1982 | European Pat. Off. . |
| 2344734 | 3/1975 | Germany . |
| 2646080 | 4/1978 | Germany . |
| 7777194 | 6/1997 | Japan . |

OTHER PUBLICATIONS

The American Chemical Society, Macromolecules, Nov. 26, 1990, vol. 23, No. 24.

9794/um Foreign Communication.

*Primary Examiner*—Peter D. Mulcahy
*Attorney, Agent, or Firm*—David G. Burleson; Daniel N. Hall; Jude A. Fry

[57] ABSTRACT

Novel silicon-containing derivatives of crystalline, high-trans-1,4 polybutadiene in which organosilicon-containing groups are bonded to the 1,2-vinyl carbon atoms along the main chain of the butadiene polymers through the carbon-silicon linkages. These derivatives of butadiene polymers are produced by the addition reaction of an organosilicon-compound having one hydrogen atom directly bonded to the silicon atom in the molecule to the double bonds in the 1,2-vinyl group butadiene polymers. These derivatives having good compatibility with siliceous fillers and when blended with filled diene rubbers are cured to elastomer compositions having excellent properties suitable for the production of tires.

12 Claims, No Drawings

HYDROSILATED CRYSTALLINE HIGH TRANS POLYBUTADINE WITH SILICA FILLER, TIRES HAVING A BASE OF SAID COMPOSITION AND METHOD OF PREPARING SAME

FIELD OF THE INVENTION

This invention relates to a novel silane derivative of high trans-1,4 polybutadienes and methods for preparation of same and their use with fillers such as silica in the production of tires.

BACKGROUND OF THE INVENTION

Silane modified rubbers have been used to improve adhesion to fillers and to improve heat resistance. Typically, silicon compounding agents such as bis-(3-triethoxysilylpropyl)-tetrasulfide have been used to improve silica filler silane interaction in rubber.

While various silane groups have been linked onto polybutadiene rubbers in an attempt to improve adhesion to silica filler and to improve heat resistance, however, it would be extremely desirable to produce elastomeric polymers capable of exhibiting reduced hysteresis when properly compounded with other ingredients such as silica-reinforcing agents and then vulcanized. Such elastomers, when fabricated into components for constructing articles such as tires, vibration isolators, power belts, and the like, will manifest properties of increased rebound, decreased rolling resistance and less heat-build up when subjected to mechanical stress during normal use.

The hysteresis of an elastomer refers to the difference between the energy applied to deform an article made from the elastomer and the energy released as the elastomer returns to its initial, undeformed state. In pneumatic tires, lowered hysteresis properties are associated with reduced rolling resistance and heat build-up during operation of the tire. These properties, in turn, result in lowered fuel consumption of vehicles using such tires and prolonged tire life. In such contexts, the property of lowered hysteresis of compounded, vulcanizable elastomer compositions is particularly significant. Examples of such compounded elastomer systems are known to the art and are comprised of at least one elastomer (that is, a natural or synthetic polymer exhibiting elastomer properties, such as a rubber), a reinforcing filler agent (such as finely divided carbon black, thermal black, or silica) and a vulcanizing system such as sulfur-containing vulcanizing (that is, curing) system.

SUMMARY OF THE INVENTION

The present invention relates to the production of a rubber additive of a crystalline high trans-1,4 polybutadiene containing silane substituents bonded onto 1,2-vinyl groups along the polybutadiene backbone at a level of one or less silane substituent per each 1,2-vinyl group. The resultant silane derivative of the high trans-1,4 polybutadiene can be blended with other rubbers and silica fillers to provide a silica filled rubber blend having both reduced Mooney viscosity and lower hysteresis properties.

DETAILED DESCRIPTION OF THE INVENTION

In accordance with the present invention, a silicon containing derivative of crystalline high trans polybutadiene is produced by a hydrosilation reaction of an organosilane compound having a Si—H linkage in the molecule to a polybutadiene having a high trans-1,4 content of at least 75%. In the hydrosilation reaction the organosilane compounds bond directly to 1,2-vinyl groups present along the polybutadiene chain as displayed in Reaction (1):

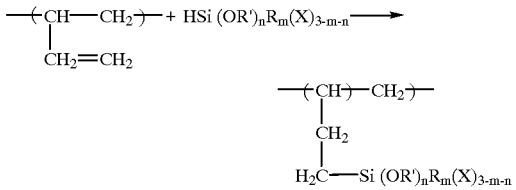

wherein R, R', m and n are defined below.

The polybutadienes employed as starting materials contain a trans 1,4 content of at least 75%, between 75 to 96% and preferably 85 to 95%, and a 1,2-vinyl content of at least about 5.0%, preferably between about to 5 to 20%. Suitable methods of preparing such high trans content polybutadienes are displayed in U.S. Pat. No. 5,174,838 to Sandstrom et al, U.S. Pat. No. 5,037,912 to Patterson et al, and copending application entitled "Process for Preparing Crystalline High 1,4-Trans Polybutadiene" to Jung W. Kang and Jason T. Poulton, which are herein incorporated by reference.

The organosilane compounds used in the addition reaction have only one hydrogen atom directly bonded to the silicon atom and are represented by the formula (2):

$$HSi(OR')_n R_m (X)_{3-m-n} \qquad (2)$$

where the R and R' groups are each the same or different monovalent hydrocarbon groups free of aliphatic unsaturation; X=Cl, Br or I; m=0, 1 or 2; n=1, 2 or 3 and $(n+m) \leq 3$. Such monovalent hydrocarbon R and R' groups include $C_1$–$C_{20}$ alkyl groups, e.g., methyl, ethyl, propyl, butyl and octyl groups; $C_3$–$C_{20}$ cycloalkyl groups, e.g., cyclopropyl, cyclohexyl; and $C_6$–$C_{20}$ aryl groups, e.g., phenyl, tolyl, xylyl and naphthyl groups and those groups which are obtained by the replacement of a hydrogen atom or atoms in the above-mentioned alkyl or aryl groups by substituents that are non-reactive with vinyl groups.

It is preferred that the R and R' alkyl groups have six or less carbon atoms. Typical examples of suitable silane compounds include trimethoxysilane, triethoxysilane, tripropoxysilane, diethoxypropoxysilane, tributoxysilane, trioctoxysilane, triphenoxysilane, tricyclohexoxysilane, trimethylsilane, dichloromethylsilane, substituted analogs thereof and the like.

The addition reaction between the high trans polybutadienes and the organosilane compounds is preferably conducted by heating a mixture of these materials with agitation under atmosphere pressure or in a pressurized vessel. These materials are heated to a temperature in a range of from about 60° to 200° C., preferably 80° to 160° C. The addition reaction is preferably conducted in a pressurizable reactor equipped with a stirrer. It is also preferable that the addition reaction be conducted in an inert gas atmosphere, such as nitrogen gas, thereby preventing the possible oxidation of the polybutadiene. It is also desirable to add an oxidation inhibitor to the reaction mixture to further deter any oxidation reaction.

The addition reaction between the butadiene polymer and an Si—H containing organosilicon compound can, advantageously, be accelerated by rhodium or platinum or a rhodium or platinum compound as the catalyst known in the art for the acceleration of the addition reaction between an aliphatically unsaturated compound and silicon-bonded hydrogen atoms. Such rhodium catalysts are exemplified by RhCl(PPh)$_3$, RhH(CO)(PR$_3$)$_3$, RhCl(CO)(PR$_3$)$_3$, [RhH(PR$_3$)$_2$(S)$_2$]$^+$ and S is a solvent such as acetonitrile or acetone, [Rh(C$_2$H$_4$)$_2$Cl]$_2$, RhCl(PR$_3$)$_4$ wherein R has been previously defined, and platinum catalysts are exemplified by platinum black, platinum-bearing alumina or silica catalysts, chloroplatinic acid, complexes of chloroplatinic acid with olefins and chloroplatinic acid modified with an alcohol. Other compounds containing transition metals other than rhodium and platinum are also capable of catalyzing the hydrosilation reaction such as Co$_2$(CO)$_4$, Ni(PR$_3$)$_2$Cl$_2$ and Ni[P(OR)$_3$]$_4$ and other compounds known to those skilled in the art for catalyzing hydrosilation as typically discussed in Speier, J. L.; *Advances in Organometallic Chemistry*; (1979), 17, 407.

The addition reaction of the silicon-bonded hydrogen atoms with the high trans-1,4 butadiene polymers leads to the silicon-containing derivatives in which the silicon-containing groups [(R'O)$_3$Si—] are predominantly bonded to the 1,2-vinyl groups pendent along the polymer backbone chain. Thus, the silicon-containing groups are bonded to the carbon atoms in the main chain through one or two intervening carbon atoms in the manner as expressed by the following formulas:

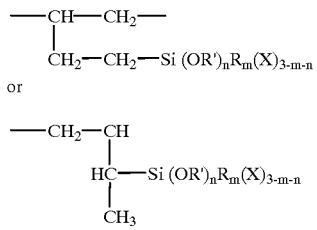

wherein R, R', X, m and n have been previously defined, preferably wherein R and R' are independently selected from the group consisting of substituted and unsubstituted C$_1$–C$_{20}$ alkyl groups, C$_3$–C$_{20}$ cycloalkyl groups, and C$_6$–C$_{20}$ aryl groups, and wherein the substituted groups are substituted with substituents that are non-reactive with vinyl groups; X=Cl, Br or I; m=0, 1 or 2; n=1, 2 or 3 and (n+m)≦3.

It is preferable that the hydrosilation substitution of the high trans-1,4 polybutadiene be limited to the substitution of organosilane substituent on the 1,2-vinyl monomer contributed units so that these substituents do not remove unsaturation in the backbone of the polymer by reacting with trans-1,4 monomer contributed units.

The advantages of the silicon-containing derivatives of butadiene polymers in accordance with the present invention over the conventional butadiene polymers are well exhibited when the extent of the addition reaction is such that at least 1% of all 1,2-vinyl groups have been saturated by the addition of the organosilicon compound with a silicon-bonded hydrogen atom in the molecule. More than 5% and up to 100% of the 1,2-vinyl double bonds originally present in the starting butadiene polymer may be saturated by the addition of the organosilicon compound with a silicon-bonded hydrogen atom in the molecule.

In order that the addition reaction proceeds to such high extent, it is recommendable that the proportion of the starting materials to be brought into the reaction is so formulated that the amount of the organosilicon compound is not in excess over the 1:1 stoichiometric amount calculated from the intended degree of addition to the 1,2-vinyl groups of the 1,2-vinyl monomer contributed units.

After completion of the addition reaction, the desired silicon-containing derivative of the butadiene polymer is isolated from the reaction mixture by suitable techniques such as coagulation in an alcohol, such as isopropanol, under reduced pressure or some other means following, if necessary, filtration. The finished products can be identified by an analytical means, such as, elementary analysis of the constituent elements including silicon, infrared absorption spectroscopy, or determination of aliphatic unsaturation along with certain physical or physicochemical measurements of the parameters, i.e., viscosity, refractive index, increases in the average molecular weight and the like. For example, the infrared absorption spectra of the products have absorption bands assigned to the 1,2-vinyl double bonds in the starting butadiene polymers decreased to a large extent or even disappeared, while absorption bands assigned to the Si—C linkages appear in the spectrum.

The characteristic advantages of the silicon-containing derivatives of high trans-1,4 butadiene polymers of the present invention over the conventional butadiene polymers may be understood by the mechanisms as the following. Firstly, improvements in thermal stability as well as in anti-oxidation resistance are consequent on the decrease of aliphatic unsaturation. Secondly, the inherent bulkiness of the silicon-containing groups bonded to the molecules of the butadiene polymers brings about decreases in the intermolecular cohesion which in turn leads to the small temperature dependency of the viscosity, the sufficient fluidity of the composition of the silicon-containing derivative with incorporated siliceous fillers and the satisfactory flexibility of the cured products obtained therefrom.

An additional advantage of the silicon-containing derivatives of butadiene polymers of the present invention may be such that the compositions obtained by incorporating siliceous fillers into the derivative display reduced Mooney viscosity, while eliminating egg blister, reducing hysteresis loss and reducing shrinkage.

The silicon-containing derivatives of butadiene polymers in accordance with the present invention are capable of producing elastic or rigid, cured products having a higher flexibility than corresponding cured products obtained from the starting butadiene polymers. The cross linking of the derivatives of the invention can be effected in various ways apparent to those skilled in the art. Proposed fields of application for the silicon-containing derivatives of high trans-1,4-polybutadienes of the present invention include tires, tire treads and tire components, the manufacture of articles, such as belts, hoses, packings and gaskets and adhesives, coatings, electric insulation by potting, encapsulation or casting, roofing, dental and medical uses.

Typical formulations of curable compositions suitable for the above-purposes comprises:

(a) 0 to 100 parts by weight, preferably 50 to 100 parts by weight, most preferably for tires 70 to 99 parts by weight of any diene rubber composition including natural rubber, polyisoprene rubber, polybutadiene rubber, styrene-butadiene copolymer rubber, chloroprene rubber, ethylene-propylene-diene terpolymer rubber, butadiene-acrylonitrile rubber, butadiene-methacrylate rubber. Diene (butadiene, isoprene, chloroprene, 2-phenyl-1,3-butadiene, piperylene, etc.). Copolymers can also be used where the comonomers implant desirable properties. The comonomers may be other conjugated dienes or vinyl aryl or isoprenyl aryl compounds or derivatives thereof having alkyl, aralkyl, cycloalkyl or halogen attached to the aromatic nucleus. Typical examples of aromatic comonomers are styrene, alphamethyl styrene, vinyl toluene, isopropenyl toluene, ethyl styrene, p-cyclohexyl styrene, o- m- and p-Cl-styrene, vinyl naphthalene, vinyl-cyclohexyl-naphthalene, 1-vinyl-4-methyl-diphenyl, 4-vinyl-4-chlorodiphenyl and the like and mixtures thereof;

(b) 1 to 30 parts by weight of the silane modified polybutadienes prepared according to the present invention;

(c) from 0.01 to 100 parts by weight of a curing agent; and (d) a filler in an amount of up to 900 parts by weight.

The silane modified high trans polybutadiene are preferably blended with other diene rubbers such as natural rubber, styrene-butadiene rubber and other polybutadiene rubbers. These rubber blends, along with suitable fillers, extenders, plasticizers, reinforcing agents, and the like, are employed in cured or cross-linked compounds.

The fillers suitable for the above purposes are either organic or inorganic, and include polyethylene, polyvinyl chloride, fluorine-containing polymers, polybutadienes, cellulose, cellulose derivatives, carbon black, quartz, fumed silica, precipitated silica, diatomaceous earth, talc, clay, alumina, calcium carbonate and magnesium carbonate, zinc oxide in the form of powder and also glass beads, glass microspheres and glass fibers. Among them, the most preferred are the siliceous fillers which bring about a great affinity between those fillers and the silicon-containing butadiene polymers and good workability of the composition.

The curing system can be either a sulfur-system or a peroxy-system. Presently preferred are the sulfur curing systems. The sulfur cured system comprises sulfur or sulfur-containing compounds such as organic sulfides, organic sulfenamides, and the like, as well as various combinations. Generally, the amount of sulfur in the free or combined form employed will be in the range of about 0.1 to 5 parts by weight per 100 parts by weight of the rubbery portion (phr) of a tread stock compound, preferably about 1 to 3 phr.

Various primary and secondary accelerators, typified by benzothiazyl disulfide or mercaptobenzothiazole or a benzothiazyl sulfenamide, benzothiazyl-2-sulfenomorpholine, or a dithiocarbamate can be incorporated. Generally, any type of commercial blending, Banbury mixer, and the like, can be employed. A generalized recipe for tire tread stocks, which tread stocks constitute a particularly desirable aspect of our invention, can include as exemplary constituents and amounts as follows:

Tire Tread Stock

| Constituent | Broad, php Parts by Weight | Preferred, php Parts by Weight |
|---|---|---|
| Diene Rubbers | 100 | 100 |
| Silane modified polybutadiene | 2–20 | 4–10 |
| Carbon Black | 15–60 | 20–50 |
| Silica | 5–200 | 10–60 |
| Extender Oil | 3–30 | 5–15 |
| Sulfur | 1–3 | f |
| Activator[a] | 1–8 | f |
| Accelerator[b] | 0.5–1.5 | f |
| Secondary accelerator[c] | 0–0.5 | f |
| Antioxidant and antiozonant[d] | 1–3 | |
| Processing aids[e] | 0–5 | |

[a]Zinc oxide, stearic acid, zinc stearate and mixtures thereof are commonly used.
[b]2-mercaptobenzothiazole, N-cyclohexy-2-benzothiazoly sulfenamide, and N-tert-butyl-2-benzothiazylsulfenamide are commonly used.
[c]Diphenylguanidine, tetramethylthiuram disulfide are commonly used.

Tire Tread Stock

| Constituent | Broad, php Parts by Weight | Preferred, php Parts by Weight |
|---|---|---|

[d]Amines such as phenyl-β-naphthylamine, diarylamine ketone reaction product, N,N'-diphenyl-p-phenylenediamine, etc., alkylated phenols, such as butylated hydroxytoluene, etc.; phosphites, such as tris(nonylphenyl) phosphite, etc., are commonly used.
[e]Hydrocarbon waxes commonly are used.
[f]Amounts of sulfur, accelerator, and secondary accelerator are interrelated, depending on desired properties of vulcanizate, as is known by those skilled in the art.

Preferable tire compositions for use in the present invention are characterized by:

(a) as a rubber ingredient, a blend of 70 to 99 parts by weight of a diene rubber and 30 to 1.0 parts by weight of a crystalline polybutadiene having a trans-1,4 content ranging between about 75% to 96% and having a 1,2-vinyl content ranging between about 5 to 20%, modified with a silane compound by reacting at least 1.0% of 1,2-vinyl groups with the silane compound represented by the formula:

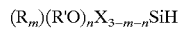

$(R_m)(R'O)_n X_{3-m-n} SiH$ wherein the R and the R' groups are each the same or different non-hydrolyzable monovalent hydrocarbon groups, X=Cl, Br or I; m=0, 1 or 2; n=1, 2 or 3 and (n+m)≦3; and (b) 5 to 200 parts by weight of silica, based on 100 parts by weight of the rubber ingredient, is applied to a least one portion among rubber portions of the tire.

Preferable rubber tire tread compositions for use in the present invention have as a rubber ingredient, a crystalline polybutadiene having a trans-1,4 content ranging between about 75% to about 96% and having a 1,2-vinyl content ranging between about 5 to 20% having at least 1.0% of 1,2-vinyl groups bonded, through carbon-to-silicon linkages, silicon-containing groups having the general formula:

$HSi(OR')_n R_m (X)_{3-m-n}$ where the R and the R' groups are each the same or different non-hydrolyzable monovalent hydrocarbon groups; X=Cl, Br or I; m=0, 1 or 2; n=1, 2 or 3 and (n+m)≦3.

Preferred polymers prepared according to the present invention include crystalline polybutadiene polymers having a trans-1,4 content of at least 75% and having a 1,2-vinyl content of at least 5%, and having at least 1% of 1,2-vinyl groups reacted to form monomer contributed units represented by one or more of the following units:

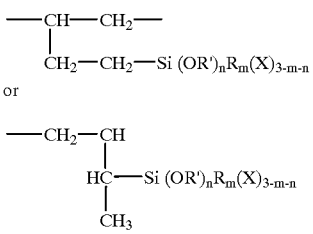

wherein R and R' are independently selected from the group consisting of substituted and unsubstituted $C_1$–$C_{20}$ alkyl groups, $C_3$–$C_{20}$ cycloalkyl groups, and $C_6$–$C_{20}$ aryl groups, and wherein the substituted groups are substituted with substituents that are non-reactive with vinyl groups; X=Cl, Br or I; m=0, 1 or 2; n=1, 2 or 3 and (n+m)≦3. These silicon containing crystalline polybutadiene polymers having a trans-1,4 content ranging between about 75% to 96% and having a 1,2-vinyl content ranging between about 5 to 20%, modified with a silane compound are produced by reacting at least 1.0% of 1,2-vinyl groups with the silane compound represented by the formula:

$$HSi(OR')_nR_m(X)_{3-m-n}$$

wherein R and R' are independently selected from the group consisting of substituted and unsubstituted $C_1$–$C_{20}$ alkyl groups, $C_3$–$C_{20}$ cycloalkyl groups, and $C_6$–$C_{20}$ aryl groups, and wherein the substituted groups are substituted with substituents that are non-reactive with vinyl groups, X=Cl, Br or I; m=0, 1 or 2; n=1, 2 or 3 and (n+m)≦3.

EXAMPLES

Examples provided are intended to illustrate and demonstrate various aspects of our invention. Specific materials employed, particular relationships, species, amounts, and the like, should be considered as illustrative and not as limitative of the reasonable scope of our invention, but rather a further elucidation of our disclosure for the benefit of those skilled in the art.

Example 1

A two gallon stainless steel reactor equipped with thermometer, stirrer, heating means, pressure means and inlet/outlet ports was purged to establish a nitrogen atmosphere. While maintaining a nitrogen atmosphere, 4086 grams of a butadiene/hexane blend containing 986 grams of 1,3-butadiene (24.1% monomer) 12.0 ml of nickel boro acylate (NiOB: 0.84 molar solution in hexane; 1.0 mM Ni phgm) in 25 ml of hexane, 49 ml of triisobutyl aluminum (TIBAL:0.62 molar solution in hexane; 3.0 mM phgm), 1.32 ml of neat triphenylphosphite (TPP:0.5 mM phgm) in 25 ml hexane and 7.8 ml of trifluoroacetic acid (TFA:10.0 mM phgm) in 25 ml hexane were charged to the reactor. The polymerization was then conducted at 121° C. for two hours. The resulting polymer cement was dropped into a five gallon bucket equipped with polyethylene liner containing excess isopropanol and an anti-oxidant. The coagulated resin was collected by filtration and oven dried at 50° C. under vacuum. The conversion of monomer to polymer was 90%. The physical properties of the resulting crystalline high trans-1,4-polybutadiene (CHT—BR) was as follows and are also displayed in Table I.
DSV (Dilute Solution Viscosity): 0.26
% Gel: 0.5
Mn: 8917
Mw: 19178
Mw/Mn: 2.15
Microstructure ($^1$H NMR in $CdCl_3$)
1,4-cis content: 7.0%
1,4-trans content: 85.6%
Vinyl content: 6.0%
Melting Point (Determined by DSC)
Tm: 50.3° C.
Tg (Glass Transition Temp.): −72.6° C.

Example 2

In a 1000 ml three neck flask fitted with a condenser, thermometer and $N_2$ inlet, 120 g of crystalline high trans-1,4 polybutadiene (7.0% vinyl, 86.0% trans, 7.0% cis) produced in Example 1 was dissolved in ~300 ml toluene. A 0.3 g charge of $RhCl(PPh_3)_3$ (0.3 mmol) was added as a slurry in 20 ml toluene giving a wine red solution. To this red solution was added 24 g of triethoxysilane $(EtO)_3SiH$ (146 mmol, ~1 silane molecule per 1,2 vinyl group). The color changed to a pale yellow. The solution was refluxed at 108° C. for ninety minutes during which the color gradually becomes a light orange. The product was recovered by coagulation in isopropanol and dried in a vacuum oven overnight at room temperature. The properties of the recovered product silane modified crystalline high trans butadiene rubber, (Si—CHT—BR) are displayed in Table I.

The following Examples 3–5 employed the crystalline high trans-1,4-polybutadiene produced in Example 2 and were intended to provide varying degrees of hydrosilation.

Example 3

The procedure of Example 2 was repeated except that the hydrosilation was carried out at reflux for 30 minutes. The properties of the recovered produce (Si—CHT—BR) are shown in Table I.

Example 4

The procedure of Example 3 was repeated except that the hydrosilation of Example 1 with 2.4 g of $(EtO)_3SiH$ (14.6 mmol, about 0.1 silane molecule per vinyl group) and the solution refluxed for 90 minutes. The properties of the recovered product (Si—CHT—BR) are shown in Table I.

Example 5

The procedure of Example 4 was repeated except that the hydrosilation was conducted at reflux for 30 minutes. The properties of the recovered product (Si—CHT—BR) are shown in Table I.

Example 6

The procedure of Example 1 was repeated except that the polymerization of 1,3-butadiene with a low level of Ni catalyst system (0.5 Ni phgm: Ni/TlBAL/TPP/TFA= 1:3:1:10 ratio) was carried out at 104° C. for 22 hours. The conversion of monomer to polymer was 81%. The physical properties of the resulting high trans-1,4-polybutadiene are as follows and are also displayed in Table I.
DSV: 0.44
% Gel: 0.7
Mn: 15379
Mw: 33855
Mw/Mn: 2.20
Microstructure ($^1$H NMR)
1,4 content: 95.3
Vinyl content: 4.7
Melting Point (Determined by DSC)
Tm1: 47° C.
Tm2: 86° C.

Example 7

In a 1000 ml three neck flask fitted with a condenser, thermometer and $N_2$ inlet, 50 g. of a higher molecular weight crystalline high trans-1,4-polybutadiene (CHT—BR)(4.6% vinyl, 91.9% trans, 3.5% cis) from Example 6 was dissolved in 400 ml toluene. A 0.15 g charge of $RhCl(PPh_3)_3$ (0.15 mmol) was added as a slurry in 20 ml of toluene giving a wine red solution. To this red solution was added 9.9 g of $(EtO)_3SiH$ (60 mmol, about 1.5 molecules of silane per vinyl group). The solution was refluxed at 108° C. for 75 minutes during which the color changed from light yellow to light orange. The product was recovered by coagulation in isopropanol and dried in a vacuum oven overnight at room temperature. The properties of the recovered Si—CHT—BR product are displayed in Table I.

Example 8

The procedure of Example 7 was repeated except that the hydrosilation of polymer with 0.99 g of (EtO)$_3$SiH (6 mmol, about 0.15 molecules of silane per vinyl group) was carried out a reflux for 75 minutes. The properties of the recovered Si—CHT—BR product are displayed in Table I.

TABLE I

| Example No. | Mn | Mw | Mw/Mn | Tg (° C.) | TM (° C.) | TM (° C.) | DSV | % gel | % 1,2 | % SIR$_3$* |
|---|---|---|---|---|---|---|---|---|---|---|
| 1 | 8917 | 19178 | 2.15 | −73 | 50 | 68 | 0.26 | 0.5 | 7.0 | — |
| 2 | 10195 | 24851 | 2.44 | −81 | 38 | 50 | 0.26 | 0.3 | 1.7 | 5.3 |
| 3 | 9837 | 23932 | 2.43 | −74 | 42 | 52 | — | — | 6.1 | 0.9 |
| 4 | 9380 | 20209 | 2.15 | −76 | 36 | 48 | — | — | 6.7 | 0.3 |
| 5 | 9543 | 20315 | 2.13 | −82 | 44 | 58 | — | — | 6.8 | 0.2 |
| 6 | 15379 | 33855 | 2.20 | — | 47 | 86 | 0.44 | 0.7 | 4.7 | — |
| 7 | 18252 | 516484 | 28.3 | — | 54 | 85 | 0.55 | 0.3 | 3.3 | 1.4 |
| 8 | 15647 | 33075 | 2.11 | — | 49 | 85 | 0.45 | 0.3 | 4.4 | 0.3 |

*% SIR$_3$ calculated from $^1$H NMR which clearly confirms the presence of the Si(OCH$_2$CH$_3$)$_3$ group and the absence of HSi(OCH$_2$CH$_3$)$_3$.

Examples 9–14

The material used in these examples was a rubber blend of natural rubber (NR) and lithium hexamethyleneimine initiated/tin tetrachloride coupled polybutadiene as prepared in EP 590491 A2 LHMI—BR* (75:25) with CHT—BR from Example 1 or hydrosilated CHT—BR, (Si—CHT—BR), produced in Examples 2 to 5. The blended rubber composition was prepared according to a compounding recipe as shown in the following Table II.

TABLE II

| Compounding, component | Parts by Weight |
|---|---|
| LHMI—BR* | 25 |
| NR | 75 |
| ISAF carbon Black | 30 |
| Silica | 15 |
| Hydrosilated CHT—BR (Si—CHT—BR) | 5.0 |
| Stearic Acid | 2.0 |
| ZnO | 3.5 |
| Anti-oxidant | 1.0 |
| Vulcanization accelerator | 1.8 |
| Sulfur | 1.4 |

*LHMI—BR = Lithiumhexamethyleneimine-initiated/tin tetrachloride coupled polybutadiene (EP 590491 A2)

Test specimens were prepared by curing the rubber composition at 145° C. for 45 minutes. The weight ratio of the rubbers and the properties of the resultant cured rubber blends are shown in Table III.

TABLE III

| Example No. | 9 (Control) | 10 | 11 | 12 | 13 | 14 |
|---|---|---|---|---|---|---|
| Rubber | | | | | | |
| Natural Rubber | 75 | 75 | 75 | 75 | 75 | 75 |
| LHMI-BR | 25 | 25 | 25 | 25 | 25 | 25 |
| CHT-BR Ex. 1 | — | 5 | — | — | — | — |

TABLE III-continued

| Example No. | 9 (Control) | 10 | 11 | 12 | 13 | 14 |
|---|---|---|---|---|---|---|
| Si-CHT-BR Ex. 2 | — | — | 5 | — | — | — |
| Si-CHT-BR Ex. 3 | — | — | — | 5 | — | — |
| Si-CHT-BR Ex. 4 | — | — | — | — | 5 | — |

TABLE III-continued

| Example No. | 9 (Control) | 10 | 11 | 12 | 13 | 14 |
|---|---|---|---|---|---|---|
| Si-CHT-BR Ex. 5 | — | — | — | — | — | 5 |
| Compd. ML$_{1+4}$ @ 100° C. | 104.2 | 88.7 | 91.7 | 89.7 | 90.4 | 86.1 |
| Viscoelastic Properties @ 50° C. | | | | | | |
| M' (M'pa) low strain modulus | 6.08 | 5.53 | 6.99 | 5.83 | 5.93 | 5.67 |
| Tan δ | 0.096 | 0.088 | 0.064 | 0.074 | 0.076 | 0.082 |

As displayed in the above examples the use of crystalline high trans polybutadiene rubber as an additive only reduced compound Mooney viscosity in the rubber blends while the use of silane modified crystalline high trans polybutadiene as an additive reduced the Mooney viscosity and lowered the hysteresis properties (Tan δ) of the rubber blends.

What is claimed is:

1. A tire, characterized in that a rubber composition comprising:
   (a) as a rubber ingredient, a blend of 70 to 99 parts by weight of a diene rubber and 30 to 1.0 parts by weight of a crystalline polybutadiene having a trans-1,4 content ranging between about 75% to 96% and having a 1,2-vinyl content ranging between about 5 to 20%, modified with a silane compound by reacting at least 1.0% of 1,2-vinyl groups with the silane compound represented by the formula:

$R_m(R'O)_nX_{3-m-n}SiH$ wherein R and R' are each the same or different non-hydrolyzable monovalent hydrocarbon groups, X=Cl, Br or I; m=0, 1 or 2; n=1, 2 or 3; and (n+m)≦3; and (b) 5 to 200 parts by weight of silica, based on 100 parts by weight of the rubber ingredient.

2. The tire as defined in claim 1 wherein the crystalline polybutadiene has a trans-1,4 content ranging between about 85% to 95%.

3. The tire as defined in claim 1 wherein R and R' are independently selected from the group consisting of one or more substituted and unsubstituted $C_1$–$C_{20}$ alkyl groups, $C_3$–$C_{20}$ cycloalkyl groups, and $C_6$–$C_{20}$ aryl groups, and wherein the substituted groups are substituted with substituents that are non-reactive with vinyl groups.

4. A rubber tire tread comprising:

(a) as a rubber ingredient, a crystalline polybutadiene having a trans-1,4 content ranging between about 75% to about 96% and having a 1,2-vinyl content ranging between about 5 to 20% having at least 1.0% of 1,2-vinyl groups bonded, through carbon-to-silicon linkages, silicon-containing groups having the general formula:

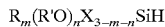

wherein R and R' are each the same or different non-hydrolyzable monovalent hydrocarbon groups, X=Cl, Br or I; m=0, 1 or 2; n=1, 2 or 3; and (n+m)≦3.

5. The rubber tire tread as defined in claim 4 wherein R and R' are independently selected from the group consisting of substituted and unsubstituted $C_1$–$C_{20}$ alkyl groups, $C_3$–$C_{20}$ cycloalkyl groups, and $C_6$–$C_{20}$ aryl groups, and wherein the substituted groups are substituted with substituents that are non-reactive with vinyl groups.

6. The rubber tire tread as defined in claim 4 wherein the crystalline polybutadiene has a trans-1,4 content ranging between about 85% to 95%.

7. The rubber tire tread as defined in claim 4 wherein R and R' are alkyl groups having one to six carbon atoms.

8. A crystalline polybutadiene polymer having a trans-1,4 content of at least 75% and having a 1,2-vinyl content of at least 5%, and having at least 1% of 1,2-vinyl groups reacted to form monomer contributed units represented by one or more of the following units:

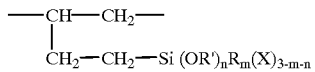

or

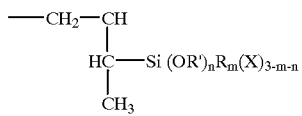

wherein R and R' are independently selected from the group consisting of substituted and unsubstituted $C_1$–$C_{20}$ alkyl groups, $C_3$–$C_{20}$ cycloalkyl groups, and $C_6$–$C_{20}$ aryl groups, and wherein the substituted groups are substituted with substituents that are non-reactive with vinyl groups; X=Cl, Br or I; m=0, 1 or 2; n=1, 2 or 3; and (n+m)≦3.

9. The crystalline polybutadiene polymer as defined in claim 8 wherein R and R' are independently selected from the group consisting of substituted and unsubstituted $C_1$–$C_{20}$ alkyl groups, $C_3$–$C_{20}$ cycloalkyl groups, and $C_6$–$C_{20}$ aryl groups, and wherein the substituted groups are substituted with substituents that are non-reactive with vinyl groups.

10. The polymer as defined in claim 8 wherein the polymer has a trans-1,4 content ranging between 85% to 95%.

11. The polymer as defined in claim 8 wherein R' is an alkyl group having one to six carbon atoms and n=3.

12. A process of preparing a silicon containing crystalline polybutadiene having a trans-1,4 content ranging between about 75% to 96% and having a 1,2-vinyl content ranging between about 5 to 20%, modified with a silane compound by reacting at least 1.0% of 1,2-vinyl groups with the silane compound represented by the formula:

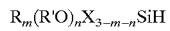

wherein R and R' are independently selected from the group consisting of substituted and unsubstituted $C_1$–$C_{20}$ alkyl groups, $C_3$–$C_{20}$ cycloalkyl groups, and $C_6$–$C_{20}$ aryl groups, and wherein the substituted groups are substituted with substituents that are non-reactive with vinyl groups, X=Cl, Br or I; m=0, 1 or 2; n=1, 2 or 3; and (n+m)≦3.

* * * * *